Figure 4:
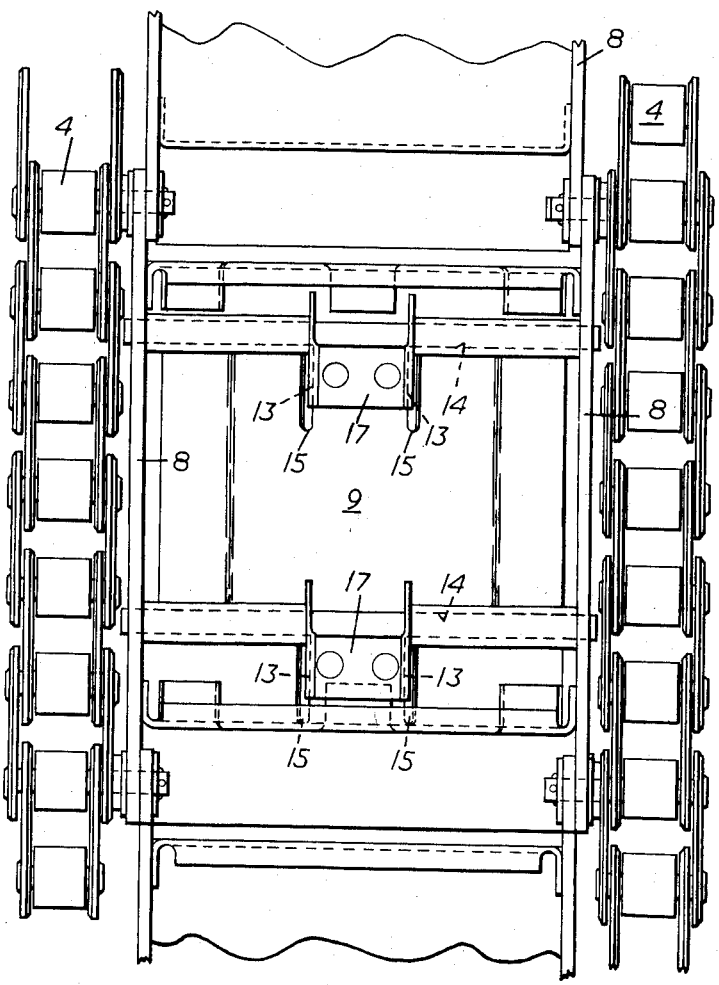

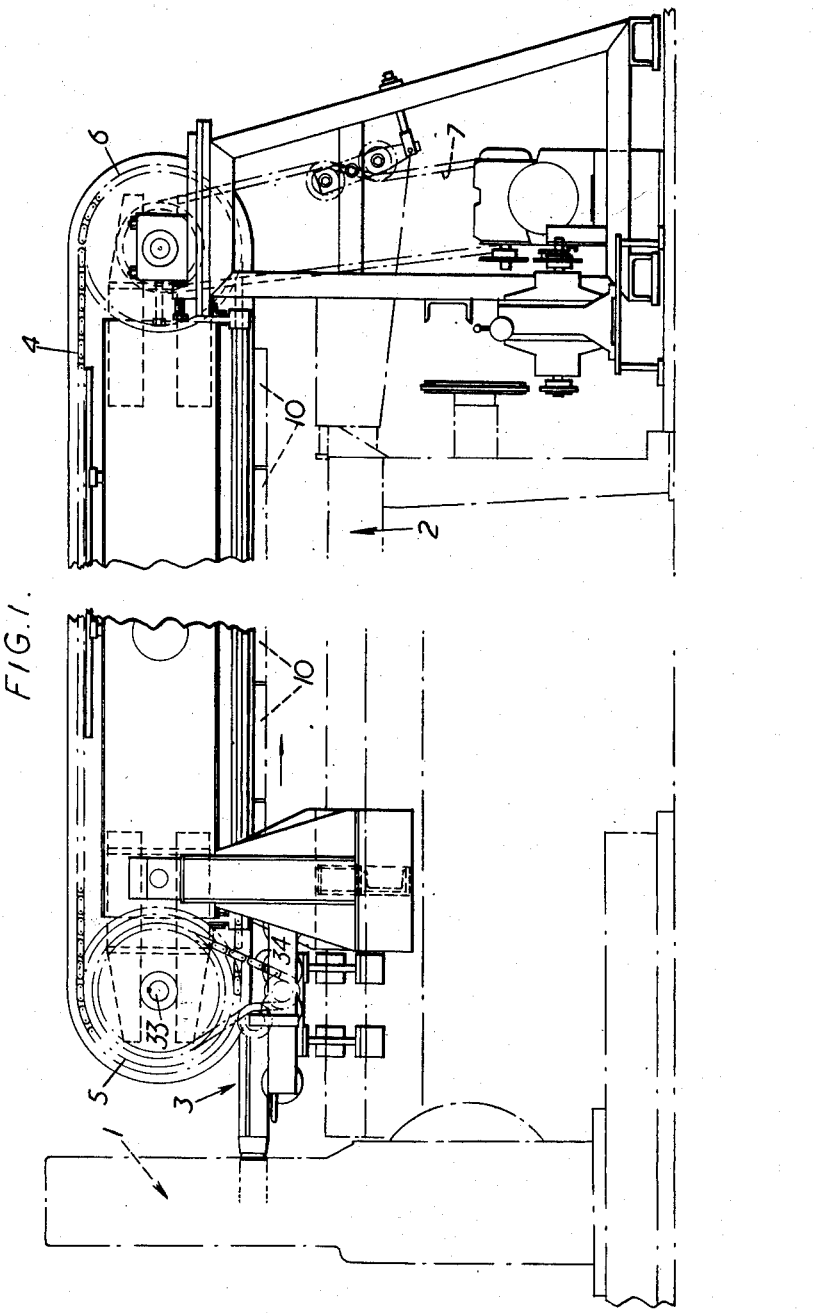

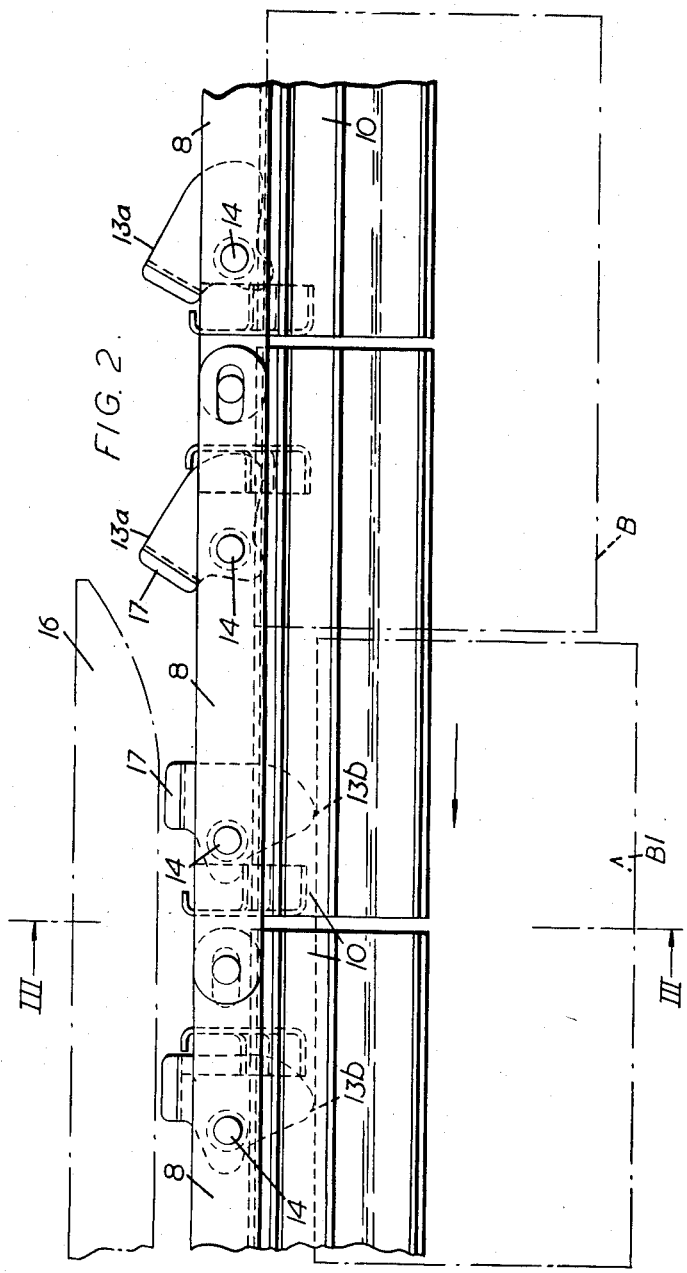

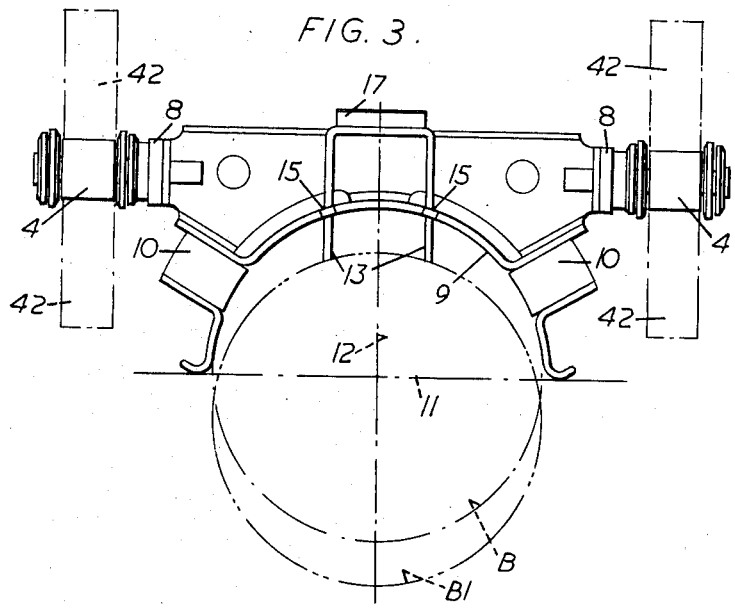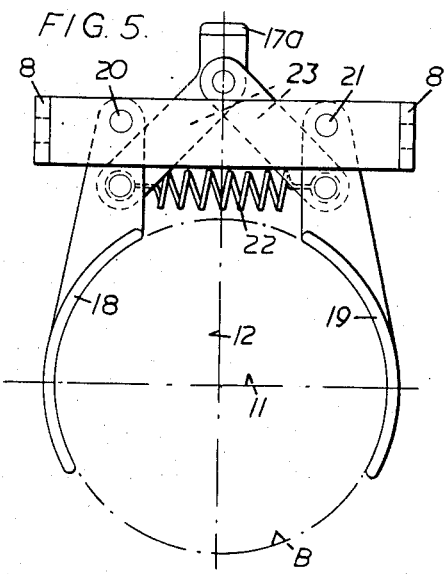

June 18, 1963    A. L. STUCHBERY ET AL    3,094,092
CAN BODY-MAKING APPARATUS
Filed Dec. 29, 1959    7 Sheets-Sheet 5

Inventors
ARTHUR L. STUCHBERY
FREDERICK D. BROOKES
By
Attorneys

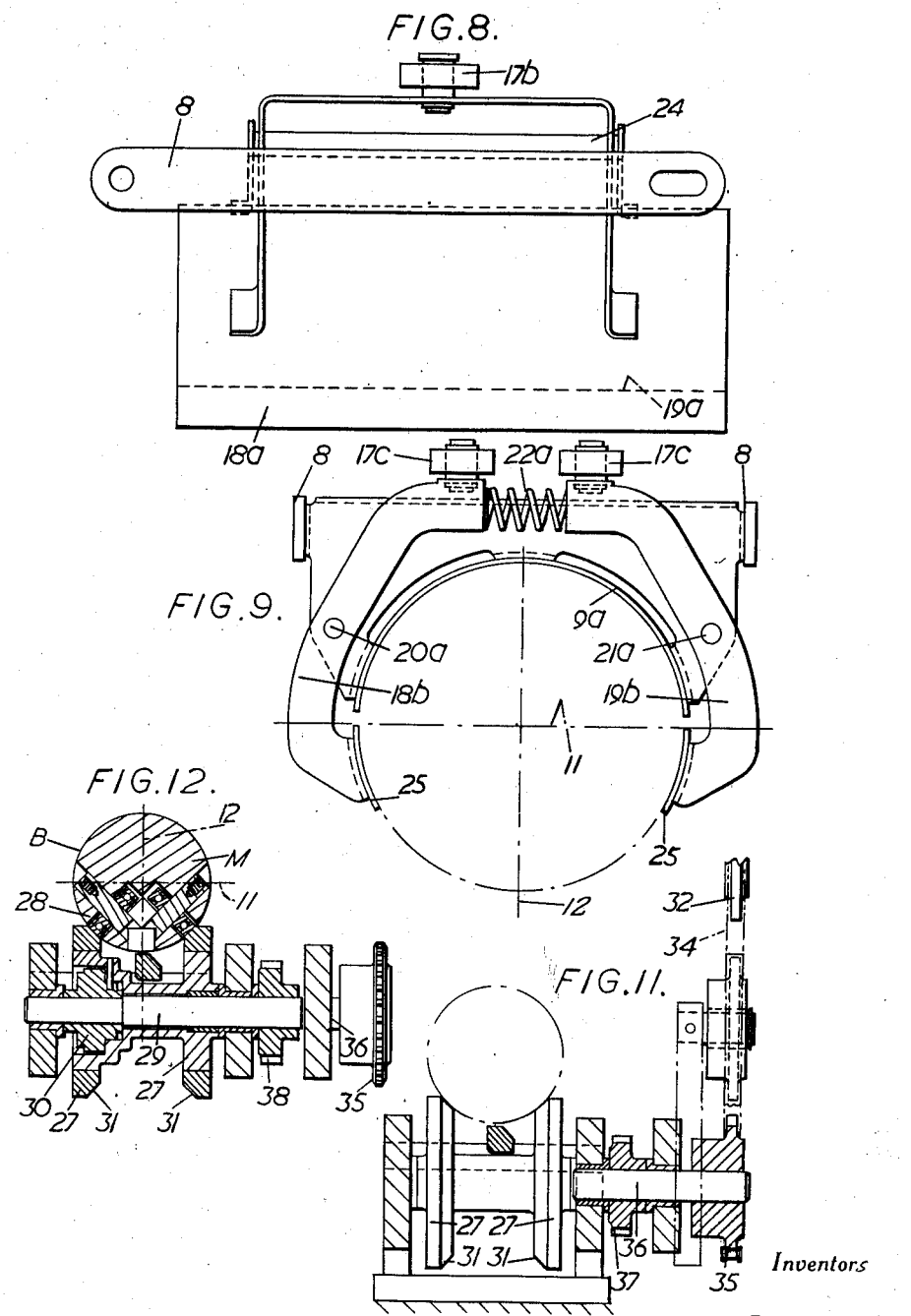

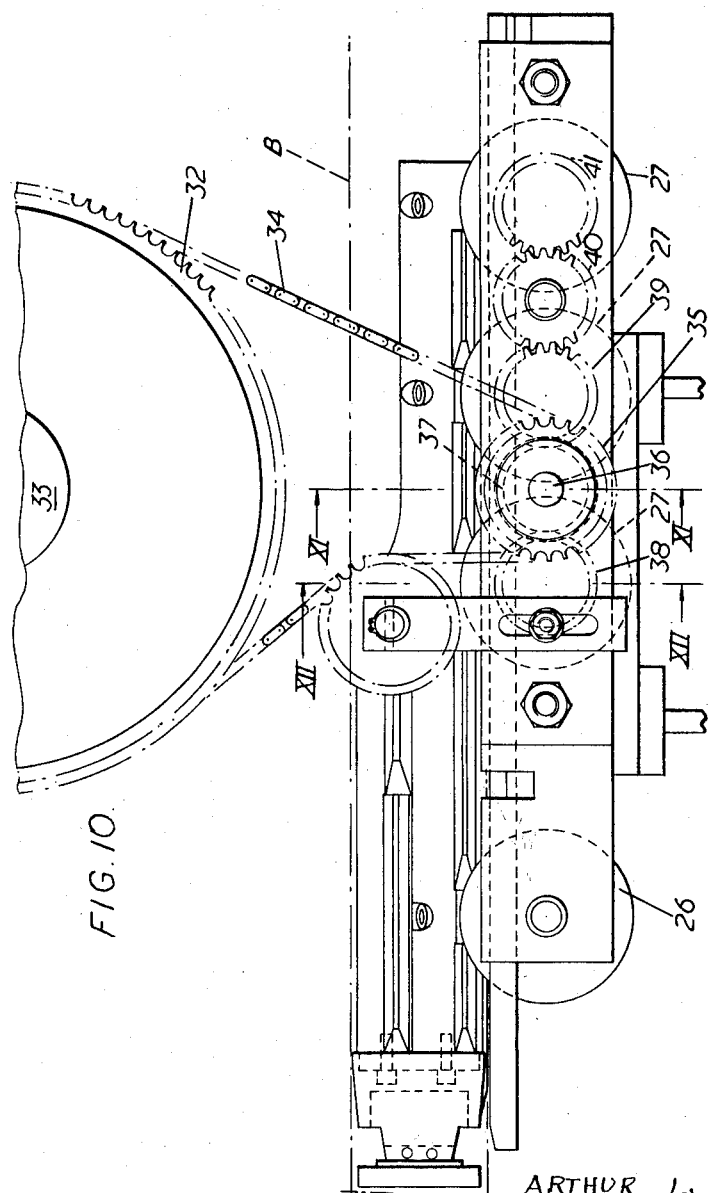

United States Patent Office 3,094,092
Patented June 18, 1963

3,094,092
CAN BODY-MAKING APPARATUS
Arthur Leslie Stuchbery, Enfield, and Frederick Daniel Brookes, Hayes, England, assignors to The Metal Box Company Limited, London, England, a company of Great Britain
Filed Dec. 29, 1959, Ser. No. 862,705
Claims priority, application Great Britain Jan. 21, 1959
15 Claims. (Cl. 113—115)

This invention relates to can body-making apparatus.

Can body-making apparatus usually comprises a body-forming station at which a blank of sheet metal is formed to substantially cylindrical tubular form with a flattened hook side-seam, and the body so formed is then transferred to a side-seam soldering station at which the side-seam is heated and filled with solder to form a hermetic seam. In the forms of apparatus at present employed the body, during soldering, is moved by a pusher piece either through a tubular element having an opening in the under-side thereof to expose the side-seam for heating and soldering, or over a cylindrical element to expose the complete outer surface of the can body. With these forms of apparatus, however, it is found that external decoration of the body in the first case, and internal decoration in the second case, is sometimes damaged due to the body rubbing against the external or internal cylinder through or over which it is passed. In the first case it is possible only to provide a relatively narrow opening through which the body may be pre-heated prior to soldering. Further, it is found that with each of these known forms of apparatus pre-heat applied to the bodies is dissipated due to the constant carrying away of heat by the static mass of the guiding means. It is also found that with the said known forms of apparatus, the spacing between successive can bodies being moved through the soldering station is such that solder droplets or splashes sometimes fall into the bodies and this is undesirable because it then becomes necessary for such solder droplets to be removed before the can bodies can be used.

It is an object of the present invention to provide a can body-making apparatus in which the can bodies are moved through the soldering station in a manner such that they are not subjected to rubbing action which might tend to damage the exterior or interior decoration thereof, which provides as great as possible a portion of the body which can be exposed to pre-heating, and which provides a relatively light means of body conveyance which reduces to negligible proportions the amount of heat loss from the body to the carrier by conduction, thus permitting a more intense pre-heating of the bodies and ensuring an even application of heat to both sides of the side-seam structures to avoid or reduce the usual expansion thereof and which causes longitudinal bending or bowing of the body which renders more difficult the operation of soldering.

A further object of the invention is to permit the cans to be moved in relatively close end-to-end succession so as to reduce to a minimum the gaps therebetween and so reduce the possibility of solder droplets or splashes entering the bodies.

According to the invention there is provided can body-making apparatus which comprises a body-forming station, side-seam soldering and subsequent operation station, transfer means to move tubular bodies from the forming station towards the soldering and subsequent operation stations, and conveyor means to receive bodies from the transfer means and to move them through the soldering and subsequent operation stations, said conveyor means including an endless conveyor movable in one direction, and a plurality of equi-spaced body-carriers connected to the conveyor for movement therewith and each arranged to grip the outer sides of a body to locate it for axial movement during pre-heating, soldering and subsequent operations on the side-seam thereof and to effect release of the body following the soldering and subsequent operations on the side-seam.

Figure 6:
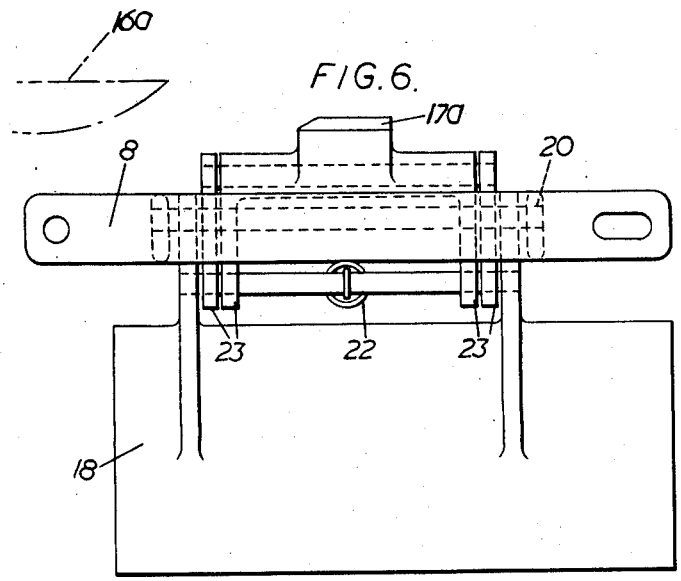
Figure 7:
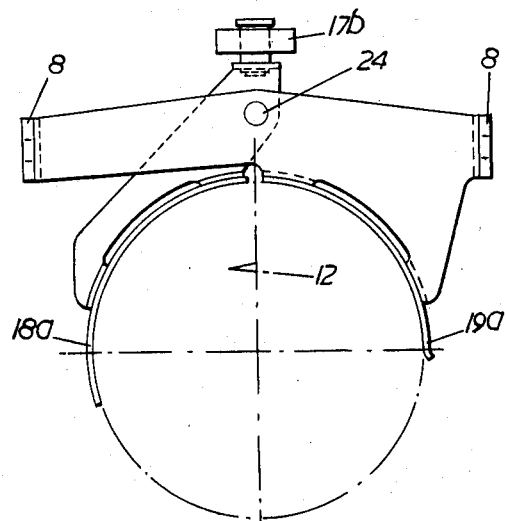

In order that the invention may be clearly understood some embodiments thereof will now be described, by way of example, with reference to the accompanying drawings, in which:

FIGURE 1 is a broken side elevation of apparatus according to the invention,

FIGURE 2 is a side elevation, to an enlarged scale, of part of the apparatus shown in FIGURE 1, FIGURE 3 is a section on line III—III, FIGURE 2, FIGURE 4 is a top plan of FIGURE 2, FIGURE 5 is an end elevation of an alternative form of carrier for a can body, FIGURE 6 is a side elevation of FIGURE 5, FIGURE 7 is an end elevation of another form of body-carrier, FIGURE 8 is a side elevation of FIGURE 7, FIGURE 9 is an end elevation of a still further alternative form of body-carrier, FIGURE 10 is a side elevation of transfer means by which bodies are transferred from a body-maker to the conveyor means, FIGURE 11 is a section on line XI—XI, FIGURE 10, and FIGURE 12 is a section on line XII—XII, FIGURE 10.

Like reference numerals refer to like parts throughout the specification and drawings.

Referring to FIGURES 1 to 4, the body-making station is indicated diagrammatically by the reference numeral 1 and the soldering and subsequent operation stations are indicated by the reference numeral 2, FIGURE 1. The body-making mechanism, and the pre-heat, soldering and subsequent operation apparatus are of known construction and will not be herein described. Bodies leaving the body-making station 1 are moved axially from the station by a pusher device, not shown, but which is that usually employed at the body-making station, and are delivered to transfer means, indicated generally in FIGURE 1, by the reference numeral 3 and illustrated in greater detail in FIGURES 10 to 12 to be described below. The transfer means 3 delivers the cans to a position at which they are engageable by conveyor means arranged to convey them through the pre-heating, soldering and subsequent operation stations in close end-to-end relation and to release them at some pre-determined position beyond the soldering and subsequent operation stations.

The conveyor means comprises an endless chain conveyor consisting of two chains 4, FIGURES 3 and 4, which chains are movable between guides 42, FIGURE 3, and are passed around sprocket wheels 5, 6, FIGURE 1, driven in any suitable manner, as by a chain 7. The chains 4 are movable in one direction and a plurality of equi-spaced body carriers are connected to the chain conveyor for movement therewith, each of the body-carriers being arranged, as will be described below, to grip the outer sides of a body B to locate it for axial movement during pre-heating and soldering of the side-seam thereof and to effect release of the body following the soldering and subsequent operations on the side-seam.

Referring to FIGURES 2 to 4, each body-carrier comprises a frame 8 which is connected to the chains 4 and is provided with a seating 9, FIGURES 3 and 4, which locates the body B for transfer by the carrier. The frame 8 has connected thereto two magnet bars 10 which extend lengthwise of the frame and are movable with the frame. The magnets may be electro-magnets, but preferably are permanent magnets. The magnet bars 10 are disposed above the plane of the horizontal diametric axis 11 of the body B, see FIGURE 3, and are on opposite sides of the plane of the vertical diametric axis 12. Thus as a carrier is moved around the sprocket 5 and begins to move along the lower run of the chains 4, the outer surface of a body which has been moved into position by the transfer means 3 is located against the seating 9 and is gripped by the magnet bars 10. It will accordingly be understood that during the continued movement of the body-carrier there is no relative movement between the body-carrier and the body B so that no damage can be effected to exterior decoration on the body. As can be seen from FIGURES 1 and 2, the successive body-carriers are so disposed on the chains 4 as to be in close end-to-end relation and it is therefore immaterial as to whether or not the successive can bodies are aligned with individual body-carriers because, as the carriers are moved to the bottom run of the chains, bodies in position for carriage through the pre-heating and soldering station will be transferred irrespective of the relative axial positions thereof and they can therefore be closed together end-to-end by the transfer means 3.

Further, as is illustrated in FIGURE 2, a single can body B may be engaged by two successive carriers for transport thereby through the pre-heating, soldering and subsequent stations thus ensuring that, irrespective of their length, the bodies can be located in close end-to-end relation while being conveyed by the carriers.

Each body-carrier is provided with ejector means supported for movement relative to the frame 8 to move a body B carried thereby away from the magnet bars 10 and out of the field thereof so as to release the body from the carrier. The ejector means comprises ejector fingers 13 pivotally mounted on the frame 8, being rockable about spindles 14 the ends of which are located in the frame 8. The fingers 13 are arranged to extend into openings 15 formed in the seating 9 and they are held in the inactive positions thereof, as illustrated at 13a, FIGURE 2, by the body B which is located against the seating 9 and is gripped by the magnet bars 10. After the body has been moved past the soldering and subsequent stations it is moved by the conveyor to the position at which it is to be released from the body-carrier and at this position a fixed cam 16 engages with a cam follower 17 carried by the fingers 13 and urges the fingers downwards to the position illustrated at 13b, FIGURE 2. The rotation of the fingers 13 about the pivots 14 by the cam 16 causes the fingers to be moved through the openings 15 and to press against the body B to move it downwards, as viewed in FIGURE 2, to a position, as illustrated at B1, at which the body is released from the magnet bars 10 and is moved beyond the magnetic field so that it falls freely away from the body-carrier.

In the embodiment of the invention illustrated in FIGURES 2 to 4 of the drawings, the ejector means comprises two pairs of ejector fingers, as can be seen clearly from FIGURES 2 and 4, the pairs being spaced apart in the direction of movement of the carrier, and the fingers of each pair being spaced apart on the opposite sides of the plane of the vertical diametric axis as can be seen from FIGURE 3. This arrangement ensures that at least two pairs of ejector fingers engage a body to effect movement thereof beyond the magnetic field. As can also be seen from FIGURE 4, the ejector fingers of each pair are rotatable about an axis which is common thereto.

If electro-magnets are employed instead of the bars 10 the bodies are reelased from the carriers by controlled interruption of the power supply to the electro-magnets at the appropriate times.

FIGURES 5 and 6 illustrate an alternative form of body-carrier which includes a frame 8 connectable to the conveyor chains 4 and a pair of clamping elements 18, 19 which are movable with the frame and are arranged to engage the outer sides of a body B, as illustrated in FIGURE 5, on opposite sides of the plane of the vertical diametric axis 12 thereof so as to grip and locate the body for soldering. The clamping elements 18, 19 are pivoted at 20, 21 respectively to the frame 8 and are urged towards each other by a spring 22. As can be seen from FIGURE 5, the lower end portions of the clamping elements extend below the plane of the horizontal diametric axis 11 of the body. The clamping elements 18, 19 are connected by toggle joints 23 which support cam follower means 17a, arranged to co-operate with a cam 16a, FIGURE 6, to control relative movement between the clamping elements.

The alternative form of carrier illustrated in FIGURES 7 and 8 also includes a frame 8 for connection to the chain conveyors 4 and is provided with two clamping elements 18a, 19a of which the element 19a is fixed to the frame 8 and the element 18a is rotatable about a pivot 24, the axis of which is located in the plane of the vertical diametric axis 12. The clamping element 18a has a cam follower roller 17b mounted thereon for co-operation with a fixed cam, not shown, but which is arranged to control movement of the clamping element 18a relative to the fixed clamping element 19a.

FIGURE 9 illustrates a still further alternative form of carrier and the carrier illustrated in FIGURE 9 comprises a frame 8 for connection to the chain conveyors 4, the frame being provided with a seating 9a against which a body B is located for transportation by the carrier. The carrier also includes clamping elements 18b, 19b, pivoted respectively at 20a and 21a. The clamping elements are provided with body-engaging portions 25 which are arranged to engage a body at positions below the horizontal diametric axis 11 as illustrated in FIGURE 9. The clamping elements are urged towards each other by a spring 22a and each clamping element supports a cam follower roller 17c for co-operation with a fixed cam, not shown, which controls rotation of the clamping elements about their pivots.

The transfer means by which tubular bodies are moved from the forming station to the position at which they are engaged by the carriers is illustrated in FIGURES 10 to 12 and comprises an arrangement of rollers which co-operate to reduce the axial spacing between the successive bodies delivered from the forming station so that the bodies can be disposed in close end-to-end relation while being conveyed through the pre-heating, soldering and subsequent operation stations by the conveyor means described above. The can bodies are delivered from the body-forming station by a conveyor device, not shown, which delivers the bodies along an internal mandrel M (FIG. 12) to a pair of freely rotatable rollers 26 carried by the mandrel M and by which rollers 26 the bodies are supported axially to be gripped between pairs of co-operating rollers 27, 28, FIGURE 12, the rollers 27 being connected to a positively rotated shaft 29 through a freewheel clutch 30. As can be seen from FIGURE 12 the rollers 27 engage the outer sides of a body B while the rollers 28 are freely rotatable and engage the inner sides of the body. As also can be seen from FIGURE 12, the positively rotatable rollers 27 are spaced apart axially on opposite sides of the plane of the vertical diametric axis 12 of a body and the rollers 27 have body-engaging surfaces 31 which are convergent towards their axis of rotation and towards the plane of the vertical diametric axis 12. As can be seen from FIGURE 12, the freely rotatable rollers 28 are rotatable about axes which are substantially parallel with the convergent body-engaging surfaces 31.

The rollers 26 also have freely rotatable rollers, similar to the rollers 28, co-operating therewith.

The rollers 27 are driven in timed relation with the conveyor chains 4 by a sprocket wheel 32 secured to the shaft 33, FIGURE 10, on which the sprocket wheels 5 are mounted, a chain 34, sprocket wheel 35 on stub shaft 36, and spur gears 37, 38, 39, 40, 41.

In operation of the apparatus, can bodies delivered from the forming station are closed together axially by the transfer means described with reference to FIGURES 10 to 12, due to the rate of rotation of the rollers 27, so that when the bodies are picked from the transfer apparatus by the carriers mounted on the endless conveyor formed by the chains 4 they are in such close end-to-end relation as substantially to reduce or to avoid the possibility of solder droplets or splashes falling into the interior of the bodies. The can bodies when gripped and located by the carriers of the conveyor means are conveyed thereby through the pre-heating and soldering station and, at any suitable pre-determined position, the stationary cam 16 is arranged to effect the release of the body from the carrier.

We claim:

1. Can body-making apparatus comprising a body-forming station, a side-seam soldering and subsequent operation stations, transfer means for indiscriminately moving tubular bodies from the forming station towards the soldering and subsequent operation stations, and conveyor means to receive bodies from the transfer means and to move them through the soldering and subsequent operation stations, said indiscriminate movement being a non-synchronous movement of the bodies both by the transfer means and from the transfer means to the conveyor means, said conveyor means including an endless conveyor movable in one direction, and a plurality of elongated body-carriers connected to the conveyor in close proximity slightly short of touching relation and for movement therewith with certain body-carriers being arranged to indiscriminately grip the outer sides of a body with relation to alignment with said body-carriers to locate it for axial movement during pre-heating, soldering and subsequent operations on the side-seam thereof and to effect release of the body following the soldering and subsequent operations on the side-seam.

2. Apparatus according to claim 1, wherein each body-carrier includes a frame connectable to the conveyor and having a seating to locate a body for soldering, and magnetic means movable with the frame to engage the outer sides of a body at positions above the plane of the horizontal diametric axis of the body and on opposite sides of the plane of the vertical diametric axis of the body thereby to retain the body in engagement with said seating, and ejector means supported for movement relative to the frame to move the body out of the field of the magnetic means thereby to release the body.

3. Apparatus according to claim 2, wherein the ejector means comprises ejector fingers pivotally mounted on the frame to extend into openings formed in the seating and be held in inactive positions thereof by a body retained in engagement with the seating, and cam means supported in the path of ejector fingers in the inactive positions thereof and operative to rotate the fingers about their pivots to cause the fingers to be moved through said openings and release the body from said magnets and move it beyond the magnetic field.

4. Apparatus according to claim 3, wherein the ejector means comprises two pairs of ejector fingers, the pairs being spaced apart in the direction of movement of the carrier and the fingers of each pair being spaced apart on opposite sides of the plane of said vertical diametric axis.

5. Apparatus according to claim 4, wherein the ejector fingers of each pair are rotatable about an axis common thereto.

6. Apparatus according to claim 1, wherein each body-carrier includes a frame connectable to the conveyor, a pair of clamping elements movable with the frame and arranged to engage the outer sides of a body on opposite sides of the plane of the vertical diametric axis thereof thereby to grip and locate the body for soldering and subsequent operations, at least one element of the pair being pivotally mounted on the frame for movement relative to the other element to effect gripping and release of a body, and control means operable to effect said relative movement between the clamping elements.

7. Apparatus according to claim 6, wherein each clamping element is pivoted to the frame and the respective pivots are disposed on opposite sides of the vertical diametric axis of the body, and wherein the control means includes a spring to rotate the clamping elements about the pivots therefor to one position thereof and cam follower means connetced with the clamping elements for engagement by a cam to rotate the clamping elements to the other positions thereof.

8. Apparatus according to claim 7, wherein the cam follower means is connected with the clamping elements by a toggle joint.

9. Apparatus according to claim 6, wherein one clamping element is fixed to the frame and the other is pivoted thereto to be rotatable towards and away from the fixed element, and the control means includes cam follower means connected with the pivoted clamping element and engageable with a cam arranged to control rotation of the pivoted clamping element.

10. Apparatus according to claim 9, wherein the axis of rotation of the pivot for the rotatable clamping element is located in the plane of said vertical diametric axis.

11. Apparatus according to claim 1, wherein the transfer means includes co-operating rotatable rollers arranged to engage the inner and outer sides of a body and to move it axially to a position at which it is engageable by a body-carrier.

12. Apparatus according to claim 11, wherein the rollers which engage the outer sides of a body are provided with means mounting said rollers for positive rotation and those which engage the inner sides are provided with means mounting said rollers for free rotation.

13. Apparatus according to claim 12, wherein the rollers mounted for positive rotation are arranged in pairs spaced apart axially on opposite sides of the plane of the vertical diametric axis of a body to be moved axially thereby, and have body-engaging surfaces convergent towards their axis of rotation and towards the plane of the vertical diametric axis, and wherein the rollers mounted for free rotation are rotatable about axes substantially parallel with said convergent body-engaging surfaces.

14. Apparatus according to claim 11, wherein the rate of rotation of the rollers is such as to reduce the axial spacing between successive bodies leaving the body former so that the bodies are arranged in close end-to-end relation for transport by the carriers.

15. Apparatus according to claim 1, wherein each body-carrier includes a frame connected to the conveyor, gripping means attached to the frame and movable relative thereto for engaging the outer sides of a body on opposite sides of the plane of the vertical diametric axis of the body to thereby grip and locate the body for soldering and subsequent operations, ejector means supported for movement relative to the frame to move the body out of gripping engagement with said gripping means to thereby release the body, and ejector actuator means apart from said frame.

References Cited in the file of this patent
UNITED STATES PATENTS

| | | |
|---|---|---|
| 2,322,221 | Cereghino | June 22, 1943 |
| 2,530,412 | Wallace | Nov. 21, 1950 |
| 2,551,616 | Maher | May 8, 1951 |
| 2,649,749 | Socke | Aug. 25, 1953 |
| 2,923,264 | Sheley | Feb. 2, 1960 |